United States Patent
Sawada et al.

(10) Patent No.: US 11,555,227 B2
(45) Date of Patent: Jan. 17, 2023

(54) NI—CR BASED ALLOY BRAZING MATERIAL CONTAINING TRACE AMOUNT OF V

(71) Applicant: Sanyo Special Steel Co., Ltd., Himeji (JP)

(72) Inventors: Toshiyuki Sawada, Himeji (JP); Shingo Fukumoto, Himeji (JP)

(73) Assignee: Sanyo Special Steel Co., Ltd., Himeji (JP)

( * ) Notice: Subject to any disclaimer, the term of this patent is extended or adjusted under 35 U.S.C. 154(b) by 238 days.

(21) Appl. No.: 16/606,926

(22) PCT Filed: Apr. 18, 2018

(86) PCT No.: PCT/JP2018/016010
§ 371 (c)(1),
(2) Date: Oct. 21, 2019

(87) PCT Pub. No.: WO2018/198906
PCT Pub. Date: Nov. 1, 2018

(65) Prior Publication Data
US 2020/0048740 A1  Feb. 13, 2020

(30) Foreign Application Priority Data
Apr. 25, 2017  (JP) ............................. JP2017-085789

(51) Int. Cl.
| | |
|---|---|
| C22C 19/05 | (2006.01) |
| B23K 1/00 | (2006.01) |
| B23K 35/30 | (2006.01) |
| B23K 1/008 | (2006.01) |
| B23K 1/19 | (2006.01) |
| B23K 1/002 | (2006.01) |
| B23K 101/00 | (2006.01) |
| B23K 101/14 | (2006.01) |
| B23K 103/04 | (2006.01) |

(52) U.S. Cl.
CPC .............. *C22C 19/051* (2013.01); *B23K 1/00* (2013.01); *B23K 1/002* (2013.01); *B23K 1/008* (2013.01); *B23K 1/19* (2013.01); *B23K 35/30* (2013.01); *B23K 35/304* (2013.01); *B23K 35/3033* (2013.01); *C22C 19/055* (2013.01); *C22C 19/056* (2013.01); *C22C 19/058* (2013.01); *B23K 2101/006* (2018.08); *B23K 2101/14* (2018.08); *B23K 2103/05* (2018.08)

(58) Field of Classification Search
CPC ... C22C 19/051; C22C 19/056; C22C 19/055; C22C 19/058; B23K 1/00; B23K 35/30; B23K 2101/14; B23K 2101/006; B23K 2103/05; B23K 1/008; B23K 1/0012; B23K 1/19; B23K 35/3033; B23K 35/304
See application file for complete search history.

(56) References Cited

U.S. PATENT DOCUMENTS

| | | | |
|---|---|---|---|
| 8,287,805 B2 | 10/2012 | Sjodin | |
| 9,486,882 B2 | 11/2016 | Hamada et al. | |
| 2011/0020166 A1 | 1/2011 | Otobe et al. | |
| 2013/0316226 A1* | 11/2013 | Adharapurapu | B23K 35/327 429/185 |
| 2016/0045987 A1* | 2/2016 | Hamada | B23K 35/0244 420/451 |
| 2016/0175992 A1* | 6/2016 | Sawada | C22C 19/058 420/452 |
| 2017/0151639 A1 | 6/2017 | Yoshizawa et al. | |
| 2017/0252872 A1 | 9/2017 | Hartmann | |

FOREIGN PATENT DOCUMENTS

| | | | | |
|---|---|---|---|---|
| DE | 102014112831 A1 | 3/2016 | | |
| EP | 2574420 B1 * | 10/2014 | ............ | B23K 1/008 |
| EP | 3009223 A1 | 4/2016 | | |
| JP | 2012183574 A | 9/2012 | | |
| JP | 2013208650 A | 10/2013 | | |
| JP | 201551459 A | 3/2015 | | |
| WO | 2009128174 A1 | 10/2009 | | |
| WO | 2013077113 A1 | 5/2013 | | |
| WO | 2015019876 A1 | 2/2015 | | |
| WO | WO-2015019876 A1 * | 2/2015 | ......... | B23K 35/3033 |
| WO | 2015198790 A1 | 12/2015 | | |

* cited by examiner

*Primary Examiner* — Keith Walker
*Assistant Examiner* — Adil A. Siddiqui
(74) *Attorney, Agent, or Firm* — The Webb Law Firm

(57) ABSTRACT

Disclosed is a Ni—Cr-based brazing alloy including, on the basis of mass %: 15%<Cr<30%; 3%<P<12%; 0%≤Si<8%; 0.01%<C<0.06%; 0%≤Ti+Zr<0.1%; 0.01%<V<0.1%; 0%≤Al<0.01%; 0.005%<O<0.025%; 0.001%<N<0.050%; 0%≤Nb<0.1%; and the balance being Ni and incidental impurities. Inequality (1): 0.2≤0.24V %/C %≤1.0 is satisfied if the alloy contains no Nb, and Inequality (2): 0.2≤(0.24V %+0.13Nb %)/C %≤1.0 is satisfied if the alloy contains Nb. Also disclosed is an inexpensive Ni—Cr-based brazing alloy containing a trace amount of V for use in the production of stainless steel heat exchangers and other steel articles. The alloy has a low liquidus temperature and high corrosion resistance, and achieves high brazing strength.

2 Claims, No Drawings

NI—CR BASED ALLOY BRAZING MATERIAL CONTAINING TRACE AMOUNT OF V

CROSS-REFERENCE TO RELATED APPLICATIONS

This application is the United States national phase of International Application No. PCT/JP2018/016010 filed Apr. 18, 2018, and claims priority to Japanese Patent Application No. 2017-085789 filed Apr. 25, 2017, the disclosures of which are hereby incorporated by reference in their entirety.

TECHNICAL FIELD

The present invention relates to a Ni—Cr-based brazing alloy, especially a Ni—Cr-based brazing alloy for use in the production of stainless steel heat exchangers and other steel articles.

BACKGROUND ART

Stainless steels have been conventionally brazed with Ni-based brazing alloys, especially JIS BNi-2 alloy (Ni—Cr—Fe—B—Si alloy), BNi-5 alloy (Ni—Cr—Si alloy), and BNi-7 alloy (Ni—Cr—P alloy), in many cases due to their high corrosion resistance and oxidation resistance. These three Ni-based brazing alloys each have different advantages and disadvantages, and are selected depending on applications. For example, the BNi-2 alloy has a relatively low liquidus temperature of about 1000° C. but its corrosion resistance is not necessarily sufficient. The BNi-5 alloy has high corrosion resistance, but has a liquidus temperature of about 1140° C., that is, requires a high brazing temperature. The BNi-7 alloy has a very low liquidus temperature of about 900° C. and relatively high corrosion resistance, but requires expensive raw materials. Thus, no Ni-based brazing alloy establishes compatibility between low liquidus temperature, high corrosion resistance, and low material costs, and there have been strong demands for a novel brazing alloy.

Proposed solutions to these issues are Ni-based brazing alloys with a low liquidus temperature and high brazing strength. Such Ni-based brazing alloys contain Cr for high corrosion resistance and P for a low liquidus temperature. For example, JP2015-51459A (Patent Document 1) discloses an inexpensive Cu-containing Ni—Cr—Fe-based brazing alloy that has a low melting temperature and high corrosion resistance and strength, for use in the production of stainless steel heat exchangers and other steel articles. WO 2009/128174 (Patent Document 2) discloses an inexpensive thermal- and corrosion-resistant Fe-based brazing alloy that has high resistance to corrosion in sulfuric acid and nitric acid and high brazing strength and are suitable for brazing of substrate parts of various stainless steels, especially ferrite stainless steels, at practical temperatures (1120° C. or lower) with good wettability on the substrate parts without coarsening the structure of the substrate.

JP2013-208650A (Patent Document 3) discloses a highly alloyed iron-based brazing filler material, a brazing method, and a product brazed with the highly alloyed iron-based brazing filler material. JP2012-183574A (Patent Document 4) discloses a nickel-based brazing alloy suitable for braze-assembling automobile exhaust system parts made of corrosion-resistant steels (for example, exhaust gas heat exchangers of exhaust gas recirculation (EGR) systems), which requires high corrosion resistance. WO 2013/077113 (Patent Document 5) discloses a brazing alloy for bonding members made of various stainless steels of general heat exchangers and other heat exchangers in EGR coolers and exhaust heat recovery systems, for example.

CITATION LIST

Patent Documents

Patent Document 1: JP2015-51459A
Patent Document 2: WO 2009/128174
Patent Document 3: JP2013-208650A
Patent Document 4: JP2012-183574A
Patent Document 5: WO 2013/077113

SUMMARY OF INVENTION

In recent years, stainless steel heat exchangers have been frequently used in automobile EGR coolers, and have grown rapidly in demand. Such heat exchangers as automobile parts are strongly required to be less expensive, leading to continuous efforts of cost reductions in brazing steps. Specifically, cost reduction has been attempted by replacing conventional brazing in a batch furnace in a high-vacuum atmosphere or high-purity argon atmosphere with brazing in a relatively low-vacuum or low-purity argon atmosphere containing a trace amount of oxygen or with brazing in a low-purity nitrogen atmosphere; or replacing the batch furnace with a continuous furnace. Such a brazing atmosphere creates evident brazing defects (residual pores) that were not problematic in conventional brazing environments.

The inventors, who conducted extensive studies for solving the new problem, have consequently found that the brazing defects can be solved by controlling the amounts and proportion of trace elements in brazing alloys and have arrived at the present invention.

Stainless steel heat exchangers are often used in severe corrosive environments. Thus, brazing alloys used in the production of such heat exchangers are required to have high corrosion resistance, and many Ni-based brazing alloys contain much Cr. Cr raw materials generally contain C, and those with a low C content are very expensive. The inventors thus concluded that a trace amount of C in a brazing alloy should be allowable for production of a low-cost Ni-based brazing alloy to achieve cost reductions in automobile heat exchangers. However, brazing experiments have presented that brazing alloys containing C create residual pores in brazed portions.

Since such residual pores increase with the C content, the inventors assumed that the residual pores occurred by generation of gas through a reaction between C in the alloy and oxygen remaining in a brazing atmosphere. The inventors have selected elements expected to have high affinity with C (Ti, Zr, V, and Nb) based on an Ellingham diagram, reconducted the experiments with brazing alloys containing those elements, and consequently found that addition of V reduces the residual pores. Such an effect was also achieved by replacing part of V with Nb. The inventors also found that V and Nb contents should be regulated to a predetermined ratio relative to the C content. Specifically, it is assumed that insufficient V and Nb contents relative to the C content leads to gasification of C that was not immobilized in the brazing alloy.

Ti and Zr, which are elements having higher carbide formation ability than V and Nb, induced production of much oxides and nitrides in a brazed portion, resulting in brazing defects. Although Ti and Zr were more effective for immobilization of C in a brazing alloy than V and Nb, they were presumably more reactive with atmospheric gas to produce oxides and nitrides of Ti and Zr inducing brazing defects.

These results suggest that V and Nb are optimal elements because they do not have excessively high reactivity with oxygen and nitrogen while having relatively high reactivity with C. Although Cr, Mo, and W are also elements prone to produce carbides though not to the extent of V and Nb, they were not effective for immobilization of C in a brazing alloy as compared to V and Nb.

An object of the invention, which has been completed based on such findings, is to provide an inexpensive Ni—Cr-based brazing alloy containing a trace amount of V, for use in the production of stainless steel heat exchangers and other steel articles, the alloy having a low liquidus temperature and high corrosion resistance, and achieving high brazing strength.

One embodiment of the present invention provides a Ni—Cr-based brazing alloy comprising, on the basis of mass %:
more than 15% and less than 30% Cr;
more than 3% and less than 12% P;
less than 8% (inclusive of 0%) Si;
more than 0.01% and less than 0.06% C;
less than 0.1% (inclusive of 0%) Ti+Zr;
more than 0.01% and less than 0.1% V;
less than 0.01% (inclusive of 0%) Al;
more than 0.005% and less than 0.025% 0;
more than 0.001% and less than 0.050% N;
less than 0.1% (inclusive of 0%) Nb; and
the balance being Ni and incidental impurities,
wherein Inequality (1): $0.2 \leq 0.24V \%/C \% \leq 1.0$ is satisfied if the alloy contains no Nb, and Inequality (2): $0.2 \leq (0.24V \% + 0.13Nb \%)/C \% \leq 1.0$ is satisfied if the alloy contains Nb.

Another embodiment of the invention provides the Ni—Cr-based brazing alloy that contains no Nb.

Another embodiment of the invention provides the Ni—Cr-based brazing alloy that contains less than 0.1% (exclusive of 0%) Nb.

Yet another embodiment of the invention provides the Ni—Cr-based brazing alloy further comprising, on the basis of mass %:
less than 1% Mn;
less than 30% Fe;
less than 10% Co;
less than 5% Mo; and
less than 7.5% Cu.

The present invention provides an inexpensive Ni—Cr-based brazing alloy containing a trace amount of V, for use in the production of stainless steel heat exchangers and other steel articles, the alloy having a low melting temperature and high corrosion resistance and achieving high brazing strength. More specifically, the Ni—Cr-based brazing alloy of the invention contains a trace amount of V in a predetermined ratio relative to C for immobilization of C in the brazing alloy to prevent gasification of C, thereby attaining excellent effects of reducing brazing defects.

DESCRIPTION OF EMBODIMENTS

The most important point of the present invention is addition of a trace amount of V in a predetermined ratio relative to the C content. In other words, the most important feature of the invention is reductions in brazing defects by addition of a trace amount of V and control of the V content to a predetermined amount and a predetermined ratio relative to the C content.

Patent Documents 1 to 3 disclose addition of V in Ni-based brazing alloys. Regarding addition of V to a predetermined level, however, Patent Document 1 states that V can slightly enhance the flexural strength of the alloy and thus may be optionally added; Patent Document 2 states that V has no influence on properties of a brazing alloy; and Patent Document 3 indicates no specific effects of V, and merely states that "V may be contained in an amount within a range". As described in these documents, V has been conventionally regarded not as an essential element for improvements in certain properties of a brazing alloy but as an optional element that has no great influence (that is, an element that may be added).

In contrast, the trace content of V in the invention is essential for a clear purpose of reductions in brazing defects. None of the documents discloses or even suggests the effects of addition of V in a predetermined amount and ratio relative to the C content, or the principle supporting the assumption that V immobilizes C, which tends to gasify in recent brazing atmospheres as described above, in a brazing alloy. In other words, the problem to be solved by the invention was not evident in conventional brazing in a high-vacuum atmosphere or high-purity argon atmosphere, and thus no such study was conducted. The effect of reducing brazing defects by addition of a trace amount of V is based on new findings that were arrived at for the first time by the present invention.

The second feature of the invention is strict regulation of the upper limits of contents of Ti, Zr, and Al, which are elements highly reactive with oxygen and nitrogen. The conventional art documents disclose, for example, Ti contents of 0.001 to 1% (Patent Document 2), 0.0 to 2.5% (Patent Document 3) and 0.01 to 3% (Patent Document 4); a Zr content of 0.001 to 1% (Patent Document 2); and Al contents of 0.001 to 1% (Patent Document 2), 0.0 to 2.5% (Patent Document 3), and 0.01 to 0.10% (Patent Document 5). All the upper limits are greater than those in the present invention, and none of the conventional art documents disclose strict regulation of these element to such low upper limits as in the present invention because those contents are not based on studies on brazing defects caused by a reaction between these elements and oxygen or nitrogen remaining in the brazing atmosphere as in the present invention.

The third feature of the invention is establishment of appropriate ranges of 0 and N contents. They are also elements that cause defects, such as oxides and nitrides, in brazed portions, and thus the upper limit of 0 and N should be strictly regulated. The inventors found these features through extensive studies, and arrived at the present invention.

The reason for the compositional limitation of the Ni—Cr-based brazing alloy according to the present invention will now be described. It should be noted that amounts of the constitutional components of the alloy in the following description are indicated on the basis of mass %.

Although Cr in the alloy of the invention is an essential element that enhances the corrosion resistance of the alloy, a higher Cr content also increases the liquidus temperature of the alloy. A Cr content of 15% or less provides insufficient increases in corrosion resistance, whereas a Cr content of 30% or more causes an excess increase in the liquidus temperature of the alloy. Thus, the Cr content should be more than 15% and less than 30%, preferably more than 18% and less than 28%, more preferably more than 20% and less than 26%.

Although P in the alloy of the invention is an essential element that decreases the liquidus temperature of the alloy, an excess P content relative to the eutectic composition increases the liquidus temperature while decreasing the flexural strength of the alloy. A P content of 3% or less or 12% or more results in a high liquidus temperature of the alloy. Thus, the P content should be more than 3% and less than 12%, preferably more than 4% and less than 10%, more preferably more than 5% and less than 8%.

Si in the alloy of the invention is an optional element that can be supplementally added in combination with P for decreasing the liquidus temperature of the alloy. An excess Si content relative to the eutectic composition, however, increases the liquidus temperature while decreasing the flexural strength of the alloy, like the case of P. A Si content of 8% or more results in a high liquidus temperature of the alloy. Thus, the Si content should be less than 8% (inclusive of 0%), preferably more than 2% and less than 7%, more preferably more than 3% and less than 6%.

C in the alloy of the invention is an element that induces residual pores in a brazed portion, and thus the upper limit of the C content should be strictly regulated. A C content of 0.01% or less requires expensive high-purity raw materials including Cr, whereas a C content of 0.06% or more causes many residual pores probably caused by generation of gas through a reaction between C in the alloy and gas in the brazing atmosphere. Thus, the C content should be more than 0.01% and less than 0.06%, preferably more than 0.02% and less than 0.05%, more preferably more than 0.03% and less than 0.04%.

Ti and Zr in the alloy of the invention are both elements that react with gas in a brazing atmosphere to form oxides and nitrides, inducing brazing defects. Thus, the total upper limit of these elements should be strictly regulated. The total amount of Ti and Zr (Ti+Zr) should be less than 0.1% (inclusive of 0%), preferably less than 0.08%, more preferably less than 0.06%.

V in the alloy of the invention is an essential element that reacts with C contained in the brazing alloy to immobilize C therein to prevent generation of gas that causes residual pores. A V content of 0.01% or less results in production of many residual pores, whereas a V content of 0.1% or more results in a reaction between V in the alloy and gas in a brazing atmosphere to form oxides and nitrides, causing brazing defects. Thus, the V content should be more than 0.01% and less than 0.1%, preferably more than 0.03% and less than 0.09%, more preferably more than 0.05% and less than 0.08%.

Al in the alloy of the invention is an element that reacts with gas in a brazing atmosphere to form oxides inducing brazing defects. Thus, the upper limit of the Al content should be strictly regulated. An Al content of 0.01% or more causes many brazing defects caused by oxides. Thus, the Al content should be less than 0.01% (inclusive of 0%), preferably less than 0.005%, more preferably less than 0.003%.

O in the alloy of the invention is an element that forms metal oxides causing brazing defects, and thus the upper limit of the O content should be strictly regulated. An O content 0.005% or less requires costly special processes such as hydrogen reduction, whereas an O content of 0.025% or more induces many brazing defects caused by metal oxides. Thus, the O content should be more than 0.005% and less than 0.025%, preferably more than 0.006% and less than 0.020%, more preferably more than 0.007% and less than 0.015%.

N in the alloy of the invention is an element that forms metal nitrides inducing brazing defects, and thus the upper limit of the N content should be strictly regulated. A N content of 0.001% or less requires a special denitrification process increasing the process costs, whereas a N content of 0.050% or more induces many brazing defects caused by metal nitrides. Thus, the N content should be more than 0.001% and less than 0.050%, preferably more than 0.003% and less than 0.040%, more preferably more than 0.004% and less than 0.030%.

Nb in the alloy of the invention is an element that reacts with C contained in a brazing alloy, though not to the extent of V, and thus may optionally be added as a supplementary element to assist V in immobilization of C in the brazing alloy to reduce generation of gas and consequent residual pores. A Nb content of 0.1% or more induces reaction of Nb with gas in a brazing atmosphere to form oxides and nitrides, resulting in brazing defects. Thus, the Nb content should be less than 0.1% (inclusive of 0%), preferably less than 0.08%, more preferably less than 0.05%. The alloy may either contain no Nb or less than 0.1% (exclusive of 0%) Nb.

Mn, Fe, Co, Mo, and Cu in the alloy of the invention are elements that may be contained within predetermined ranges. However, a Mn content of 1% or more induces many brazing defects caused by oxides, a Fe content of 30% or more excessively increases the liquidus temperature of the alloy, a Co content of 10% or more increases raw material costs, a Mo content of 5% or more excessively increases the liquidus temperature of the alloy, and a Cu content of 7.5% or more decreases the flexural strength of the alloy. Thus, the preferred contents of these elements are as follows: less than 1% (inclusive of 0%) Mn; less than 30% (inclusive of 0%) Fe; less than 10% (inclusive of 0%) Co; less than 5% (inclusive of 0%) Mo; and less than 7.5% (inclusive of 0%) Cu. More preferably, the Mn content is more than 0.1% and less than 0.7%, the Fe content is more than 10% and less than 27%, the Co content is less than 5%, the Mo content is less than 4%, and the Cu content is less than 5%. Even more preferably, the Mn content is more than 0.15% and less than 0.5%, the Fe content is more than 15% and less than 25%, the Co content is less than 2%, the Mo content is less than 3%, and the Cu content is less than 3%.

The balance of the alloy of the invention consists of Ni and incidental impurities. The content of incidental impurities is preferably 1% or less (inclusive of 0%), more preferably 0.5% or less, even more preferably 0.1% or less.

The alloy of the invention satisfies Inequality (1): $0.2 \leq 0.24V \%/C \% \leq 1.0$, if the alloy contains no Nb, and satisfies Inequality (2): $0.2 \leq (0.24V \% + 0.13Nb \%)/C \% \leq 1.0$, if the alloy contains Nb. In the inequalities, "V %", "Nb %", and "C %" indicate the contents of V, Nb, and C, respectively. The term 0.24V %/C % in the absence of Nb and the term (0.24V %+0.13Nb %)/C % in the presence of Nb indicate parameters to be controlled for reducing residual pores. If these parameters are less than 0.2, then contents of V and Nb for immobilization of C in a brazing alloy are inadequate, inducing generation of gas to cause many residual pores. If these parameters are greater than 1.0, excess V and Nb react with gas in a brazing atmosphere to form oxides and nitrides, resulting in brazing defects. The preferred range of the parameters is 0.3 or more and 0.8 or less, more preferably 0.4 or more and 0.7 or less. It should be noted that V and Nb have different effects on immobilization of C in a brazing alloy, and thus the coefficients multiplied to their contents are also different.

EXAMPLES

The present invention will now be described in more details by way of Examples. Alloy samples 1 to 53 were prepared for evaluation of influences of V and Nb contents and the parameters of the Inequalities (1) and (2) on residual pores and other properties of the alloy, which are the most important in the present invention. The samples had one of the following basic compositions: Ni (balance), 29% Cr, 6% P, and 4% Si; Ni (balance), 25% Cr, 11% P, 0.05% Ti, and 0.005% Al; and Ni (balance), 16% Cr, 4% P, 0.05% Ti, 0.04% Zr, and 0.009% Al, and the C, V, and Nb contents and parameters of the Inequalities (1) and (2) were varied, as shown in Tables 1 and 2. Various properties of the samples were evaluated.

Alloy samples 54 to 99 with the compositions shown in the Tables 3 and 4 were prepared, and were evaluated for influences of each of the aforementioned elements on various properties of the samples.

Inventive and comparative samples (centrifugally cast materials) were prepared and evaluated for various properties as follows.

(1) Preparation of Centrifugally Cast Materials

Base materials (200 g) weighed to contain predetermined components were melted in an alumina refractory melting pot in an atmosphere that was vacuumed to 1.3 Pa (approximately $1 \times 10^{-2}$ Torr) and then purged with argon, and were centrifugally cast in a copper mold with a diameter of 35 mm and height of 30 mm. Sample 91 was melted in an atmosphere that was vacuumed to 0.13 Pa (approximately $1 \times 10^{-3}$ Torr) and purged with high-purity argon.

(2) Evaluation of Liquidus Temperature of Centrifugally Cast Materials

A small specimen of about 15 mg was cut out of the centrifugally cast materials, and was evaluated by differential thermal analysis (DTA). In the measurement, the specimen was heated from room temperature to 1200° C. at a rate of 20° C./min, maintained at 1200° C. for 5 minutes, and then was cooled to room temperature at a rate of −20° C./min. The temperature at the start of the first exothermic peak in the cooling process was defined as a liquidus temperature. The measurement was performed in argon flow. Specimens with a liquidus temperature lower than 1050° C. were ranked A, and those with a liquidus temperature of 1050° C. or higher were ranked B.

(3) Preparation of Test Specimens Brazed with Stainless Steel SUS430 and Evaluation of Flexural Strength A 10×10×0.8 mm thin-film specimen was cut out of the centrifugally cast materials, and was then placed in the center of the 20×20 surface of a 20×20×10 stainless steel SUS430 block, such that the 10×10 surface of the thin-film specimen came into contact with the 20×20 surface of the stainless steel SUS430 block, and the diagonal lines of the specimen were aligned with those of the stainless steel SUS430 block. Another 20×20×10 stainless steel SUS430 block was overlaid on the thin-film specimen. The upper stainless steel SUS430 block was placed such that its four corners were aligned with the opposite four corners of the lower stainless steel SUS430 block. The stack was then placed in a heating furnace. The furnace was vacuumed to 27 Pa (approximately $2 \times 10^{-1}$ Torr) with a rotary pump, heated to 1100° C., and maintained for 30 minutes for brazing.

A 2×2×(20+braze thickness) mm flexural test specimen was cut out of the brazed material. The flexural test specimen was cut such that the longitudinal axis thereof was aligned to the vertical axis of the brazed material. The brazed portion was thereby positioned at the center of the longitudinal axis of the flexural test specimen. The flexural test specimen was subjected to evaluation of the flexural strength at the brazed portion using a three-point flexural test machine with a distance between supporting pins of 10 mm. More specifically, the flexural test specimen was placed on the test machine such that the brazed portion, which was positioned in the middle of the longitudinal axis of the specimen was positioned in the middle between the supporting pins. Indentation load was applied to the brazed portion until fracture occurred. Specimens with a flexural strength of 500 MPa or more were ranked A, and those with a flexural strength less than 500 MPa were ranked B.

(4) Preparation of Specimens Brazed with Stainless Steel SUS430 and Evaluation of Corrosion Resistance A 3×3×3 mm cubic specimen was cut out of the centrifugally cast material, and was then placed on the center of a stainless steel SUS430 disc with a diameter of 20 mm and thickness of 5 mm. The stack was then placed in a heating furnace. The furnace was vacuumed to 27 Pa (approximately $2 \times 10^{-1}$ Torr) with a rotary pump, heated to 1100° C., and maintained for 30 minutes for brazing. The brazed material was sprayed with 20% brine at 35° C. for 16 hours, and was evaluated for the corrosion resistance based on subsequent rust formation. Specimens with no rust formation were ranked A, those with partial rust formation were ranked B, and those with rust formation over the entire surface were ranked C.

(5) Evaluation of Residual Pores, Oxides, and Nitrides in the Portion Brazed with Stainless Steel SUS430

A 3×3×3 mm cubic specimen was cut out of the centrifugally cast materials, and was then placed on the center of a stainless steel SUS430 disc with a diameter of 20 mm and thickness of 5 mm. The stack was then placed in a heating furnace. The furnace was vacuumed to 27 Pa (approximately $2 \times 10^{-1}$ Torr) with a rotary pump, heated to 1100° C., and maintained for 30 minutes for brazing. The brazed portion (center of the disc) was polished, and a 10×10 mm area of the specimen was observed with an optical microscope to confirm the number of brazing defects of large residual pores, oxides, and nitrides with a diameter greater than 30 µm. Specimens with a total number of defects of 0 or 1 were ranked A, those with a total number of defects of 2 to 5 were ranked B, and those with a total number of defects of 6 or more were ranked C.

For the brazing alloys used in the comparative examples, the test specimens were vacuumed to 2.7 Pa (approximately $2 \times 10^{-2}$ Torr) and brazed at the same temperature and time. All the specimens were evaluated as A or B in the evaluation of total defects, that is, no specimen was evaluated as C.

TABLE 1

| No. | Composition (mass %) | | | | | | | | | | | | | | | | |
| --- | --- | --- | --- | --- | --- | --- | --- | --- | --- | --- | --- | --- | --- | --- | --- | --- | --- |
|  | Cr | P | Si | C | Ti | Zr | V | Al | O | N | Nb | Mn | Fe | Co | Mo | Cu | Ni | Ti + Zr |
| 1 | 29 | 6 | 4 | 0.015 | — | — | 0.02 | — | 0.007 | 0.030 | — | — | — | — | — | — | Balance | — |
| 2 | 29 | 6 | 4 | 0.015 | — | — | 0.06 | — | 0.006 | 0.040 | — | — | — | — | — | — | Balance | — |
| 3 | 29 | 6 | 4 | 0.020 | — | — | 0.02 | — | 0.006 | 0.030 | — | — | — | — | — | — | Balance | — |
| 4 | 29 | 6 | 4 | 0.020 | — | — | 0.06 | — | 0.006 | 0.040 | — | — | — | — | — | — | Balance | — |
| 5 | 29 | 6 | 4 | 0.035 | — | — | 0.06 | — | 0.006 | 0.030 | — | — | — | — | — | — | Balance | — |
| 6 | 29 | 6 | 4 | 0.035 | — | — | 0.09 | — | 0.007 | 0.030 | — | — | — | — | — | — | Balance | — |

TABLE 1-continued

| No | Cr | P | Si | C | Ti | Zr | V | Al | O | N | Nb | Mn | Fe | Co | Mo | Cu | Ni | Ti + Zr |
|---|---|---|---|---|---|---|---|---|---|---|---|---|---|---|---|---|---|---|
| 7  | 29 | 6 | 4 | 0.045 | — | — | 0.06 | — | 0.006 | 0.030 | — | — | — | — | — | — | Balance | — |
| 8  | 29 | 6 | 4 | 0.045 | — | — | 0.09 | — | 0.006 | 0.020 | — | — | — | — | — | — | Balance | — |
| 9  | 29 | 6 | 4 | 0.055 | — | — | 0.06 | — | 0.009 | 0.020 | — | — | — | — | — | — | Balance | — |
| 10 | 29 | 6 | 4 | 0.055 | — | — | 0.09 | — | 0.009 | 0.020 | — | — | — | — | — | — | Balance | — |
| 11 | 29 | 6 | 4 | <u>0.010</u> | — | — | 0.02 | — | 0.010 | 0.030 | — | — | — | — | — | — | Balance | — |
| 12 | 29 | 6 | 4 | <u>0.010</u> | — | — | 0.06 | — | 0.008 | 0.030 | — | — | — | — | — | — | Balance | — |
| 13 | 29 | 6 | 4 | 0.015 | — | — | <u>0.01</u> | — | 0.006 | 0.040 | — | — | — | — | — | — | Balance | — |
| 14 | 29 | 6 | 4 | 0.015 | — | — | 0.09 | — | 0.007 | 0.040 | — | — | — | — | — | — | Balance | — |
| 15 | 29 | 6 | 4 | 0.020 | — | — | <u>0.01</u> | — | 0.006 | 0.040 | — | — | — | — | — | — | Balance | — |
| 16 | 29 | 6 | 4 | 0.020 | — | — | 0.09 | — | 0.009 | 0.020 | — | — | — | — | — | — | Balance | — |
| 17 | 29 | 6 | 4 | 0.035 | — | — | 0.02 | — | 0.009 | 0.040 | — | — | — | — | — | — | Balance | — |
| 18 | 29 | 6 | 4 | 0.035 | — | — | <u>0.10</u> | — | 0.010 | 0.030 | — | — | — | — | — | — | Balance | — |
| 19 | 29 | 6 | 4 | 0.045 | — | — | 0.02 | — | 0.006 | 0.010 | — | — | — | — | — | — | Balance | — |
| 20 | 29 | 6 | 4 | 0.045 | — | — | <u>0.10</u> | — | 0.006 | 0.040 | — | — | — | — | — | — | Balance | — |
| 21 | 29 | 6 | 4 | 0.055 | — | — | 0.02 | — | 0.007 | 0.040 | — | — | — | — | — | — | Balance | — |
| 22 | 29 | 6 | 4 | 0.055 | — | — | <u>0.10</u> | — | 0.008 | 0.030 | — | — | — | — | — | — | Balance | — |
| 23 | 29 | 6 | 4 | <u>0.060</u> | — | — | 0.06 | — | 0.006 | 0.040 | — | — | — | — | — | — | Balance | — |
| 24 | 29 | 6 | 4 | <u>0.060</u> | — | — | 0.09 | — | 0.009 | 0.030 | — | — | — | — | — | — | Balance | — |
| 25 | 29 | 6 | 4 | 0.020 | — | — | 0.05 | — | 0.008 | 0.040 | 0.02 | — | — | — | — | — | Balance | — |
| 26 | 29 | 6 | 4 | 0.020 | — | — | 0.04 | — | 0.008 | 0.040 | 0.04 | — | — | — | — | — | Balance | — |
| 27 | 29 | 6 | 4 | 0.020 | — | — | 0.03 | — | 0.006 | 0.040 | 0.06 | — | — | — | — | — | Balance | — |
| 28 | 29 | 6 | 4 | 0.020 | — | — | 0.02 | — | 0.007 | 0.030 | 0.08 | — | — | — | — | — | Balance | — |

| No. | Inequality (1) | Inequality (2) | Liquidus | Flexural strength | Corrosion resistance | Brazing defects | Remarks |
|---|---|---|---|---|---|---|---|
| 1  | 0.32 | — | A | A | A | A | Inventive Examples |
| 2  | 0.96 | — | A | A | A | A | |
| 3  | 0.24 | — | A | A | A | A | |
| 4  | 0.72 | — | A | A | A | A | |
| 5  | 0.41 | — | A | A | A | A | |
| 6  | 0.62 | — | A | A | A | A | |
| 7  | 0.32 | — | A | A | A | A | |
| 8  | 0.48 | — | A | A | A | A | |
| 9  | 0.26 | — | A | A | A | A | |
| 10 | 0.39 | — | A | A | A | A | |
| 11 | 0.48 | — | A | A | A | A | Comparative Examples |
| 12 | <u>1.44</u> | — | A | B | A | C | |
| 13 | <u>0.16</u> | — | A | B | A | C | |
| 14 | <u>1.44</u> | — | A | B | A | C | |
| 15 | <u>0.12</u> | — | A | B | A | C | |
| 16 | <u>1.08</u> | — | A | B | A | C | |
| 17 | <u>0.14</u> | — | A | B | A | C | |
| 18 | 0.69 | — | A | B | A | C | |
| 19 | <u>0.11</u> | — | A | B | A | C | |
| 20 | 0.53 | — | A | B | A | C | |
| 21 | <u>0.09</u> | — | A | B | A | C | |
| 22 | 0.44 | — | A | B | A | C | |
| 23 | 0.24 | — | A | B | A | C | |
| 24 | 0.36 | — | A | B | A | C | |
| 25 | — | 0.73 | A | A | A | A | Inventive Examples |
| 26 | — | 0.74 | A | A | A | A | |
| 27 | — | 0.75 | A | A | A | A | |
| 28 | — | 0.76 | A | A | A | A | |

Note 1)
Underlined value indicates out of the range of the invention.

Note 2)
Examples 11 and 12 require expensive low-C raw materials.

TABLE 2

| | Composition (mass %) | | | | | | | | | | | | | | | | | |
|---|---|---|---|---|---|---|---|---|---|---|---|---|---|---|---|---|---|---|
| No | Cr | P | Si | C | Ti | Zr | V | Al | O | N | Nb | Mn | Fe | Co | Mo | Cu | Ni | Ti + Zr |
| 29 | 29 | 6  | 4 | 0.020 | — | — | <u>0.01</u> | — | 0.006 | 0.030 | 0.10 | — | — | — | — | — | Balance | — |
| 30 | 29 | 6  | 4 | 0.020 | — | — | 0.06 | — | 0.008 | 0.030 | 0.06 | — | — | — | — | — | Balance | — |
| 31 | 29 | 6  | 4 | 0.035 | — | — | 0.05 | — | 0.009 | 0.040 | 0.02 | — | — | — | — | — | Balance | — |
| 32 | 29 | 6  | 4 | 0.035 | — | — | 0.08 | — | 0.006 | 0.040 | 0.04 | — | — | — | — | — | Balance | — |
| 33 | 29 | 6  | 4 | 0.045 | — | — | 0.03 | — | 0.007 | 0.030 | 0.06 | — | — | — | — | — | Balance | — |
| 34 | 29 | 6  | 4 | 0.045 | — | — | 0.05 | — | 0.007 | 0.040 | 0.08 | — | — | — | — | — | Balance | — |
| 35 | 29 | 6  | 4 | 0.055 | — | — | 0.02 | — | 0.007 | 0.040 | 0.08 | — | — | — | — | — | Balance | — |
| 36 | 25 | 11 | — | 0.015 | 0.05 | — | 0.02 | 0.005 | 0.015 | 0.030 | — | — | — | — | — | — | Balance | 0.05 |
| 37 | 25 | 11 | — | 0.055 | 0.05 | — | 0.09 | 0.005 | 0.017 | 0.040 | — | — | — | — | — | — | Balance | 0.05 |
| 38 | 25 | 11 | — | <u>0.010</u> | 0.05 | — | 0.02 | 0.005 | 0.016 | 0.040 | — | — | — | — | — | — | Balance | 0.05 |
| 39 | 25 | 11 | — | 0.015 | 0.05 | — | <u>0.01</u> | 0.005 | 0.015 | 0.040 | — | — | — | — | — | — | Balance | 0.05 |
| 40 | 25 | 11 | — | 0.015 | 0.05 | — | 0.09 | 0.005 | 0.015 | 0.030 | — | — | — | — | — | — | Balance | 0.05 |

TABLE 2-continued

| No. | Cr | P | Si | C | Ti | Zr | V | Al | O | N | Nb | Mn | Fe | Co | Mo | Cu | Ni | Ti + Zr |
|---|---|---|---|---|---|---|---|---|---|---|---|---|---|---|---|---|---|---|
| 41 | 25 | 11 | — | 0.055 | 0.05 | — | 0.02 | 0.005 | 0.016 | 0.040 | — | — | — | — | — | — | Balance | 0.05 |
| 42 | 25 | 11 | — | 0.055 | 0.05 | — | 0.10 | 0.005 | 0.018 | 0.040 | — | — | — | — | — | — | Balance | 0.05 |
| 43 | 25 | 11 | — | 0.060 | 0.05 | — | 0.09 | 0.005 | 0.016 | 0.040 | — | — | — | — | — | — | Balance | 0.05 |
| 44 | 25 | 11 | — | 0.055 | 0.05 | — | 0.07 | 0.005 | 0.015 | 0.040 | 0.04 | — | — | — | — | — | Balance | 0.05 |
| 45 | 25 | 11 | — | 0.055 | 0.05 | — | 0.05 | 0.005 | 0.014 | 0.040 | 0.08 | — | — | — | — | — | Balance | 0.05 |
| 46 | 16 | 4 | — | 0.020 | 0.05 | 0.04 | 0.06 | 0.009 | 0.024 | 0.020 | — | — | — | — | — | — | Balance | 0.09 |
| 47 | 16 | 4 | — | 0.045 | 0.05 | 0.04 | 0.06 | 0.009 | 0.023 | 0.030 | — | — | — | — | — | — | Balance | 0.09 |
| 48 | 16 | 4 | — | 0.010 | 0.05 | 0.04 | 0.06 | 0.009 | 0.020 | 0.020 | — | — | — | — | — | — | Balance | 0.09 |
| 49 | 16 | 4 | — | 0.045 | 0.05 | 0.04 | 0.10 | 0.009 | 0.024 | 0.020 | — | — | — | — | — | — | Balance | 0.09 |
| 50 | 16 | 4 | — | 0.060 | 0.05 | 0.04 | 0.06 | 0.009 | 0.023 | 0.030 | — | — | — | — | — | — | Balance | 0.09 |
| 51 | 16 | 4 | — | 0.045 | 0.05 | 0.04 | 0.04 | 0.009 | 0.024 | 0.030 | 0.04 | — | — | — | — | — | Balance | 0.09 |
| 52 | 16 | 4 | — | 0.045 | 0.05 | 0.04 | 0.02 | 0.009 | 0.022 | 0.020 | 0.08 | — | — | — | — | — | Balance | 0.09 |
| 53 | 16 | 4 | — | 0.045 | 0.05 | 0.04 | 0.01 | 0.009 | 0.024 | 0.020 | 0.10 | — | — | — | — | — | Balance | 0.09 |

| No. | Inequality (1) | Inequality (2) | Liquidus | Flexural strength | Corrosion resistance | Brazing defects | Remarks |
|---|---|---|---|---|---|---|---|
| 29 | — | 0.77 | A | B | A | C | C |
| 30 | — | 1.11 | A | B | A | C |  |
| 31 | — | 0.42 | A | A | A | A | I |
| 32 | — | 0.70 | A | A | A | A |  |
| 33 | — | 0.33 | A | A | A | A |  |
| 34 | — | 0.50 | A | A | A | A |  |
| 35 | — | 0.28 | A | A | A | A |  |
| 36 | 0.32 | — | A | A | A | A |  |
| 37 | 0.39 | — | A | A | A | A |  |
| 38 | 0.48 | — | A | A | A | A | C |
| 39 | 0.16 | — | A | B | A | C |  |
| 40 | 1.44 | — | A | B | A | C |  |
| 41 | 0.09 | — | A | B | A | C |  |
| 42 | 0.44 | — | A | B | A | C |  |
| 43 | 0.36 | — | A | B | A | C |  |
| 44 | — | 0.40 | A | A | A | A | I |
| 45 | — | 0.41 | A | A | A | A |  |
| 46 | 0.72 | — | A | A | A | A |  |
| 47 | 0.32 | — | A | A | A | A |  |
| 48 | 1.44 | — | A | A | A | A | C |
| 49 | 0.53 | — | A | B | A | C |  |
| 50 | 0.24 | — | A | B | A | C |  |
| 51 | — | 0.33 | A | A | A | A | I |
| 52 | — | 0.34 | A | A | A | A |  |
| 53 | — | 0.34 | A | B | A | C | C |

Note 1)
Underlined value indicates out of the range of the invention.
Note 2)
Examples 38 and 48 require expensive low-C raw materials.
Note 3)
I: Inventive Examples; C: Comparative Examples

TABLE 3

| | Composition (mass %) | | | | | | | | | | | | | | | | | |
|---|---|---|---|---|---|---|---|---|---|---|---|---|---|---|---|---|---|---|
| No. | Cr | P | Si | C | Ti | Zr | V | Al | O | N | Nb | Mn | Fe | Co | Mo | Cu | Ni | Ti + Zr |
| 54 | 29 | 6 | — | 0.050 | 0.01 | 0.08 | 0.04 | 0.005 | 0.022 | 0.020 | 0.06 | 0.8 | 10 | 7 | — | — | Balance | 0.09 |
| 55 | 16 | 7 | 3 | 0.040 | 0.07 | — | 0.05 | 0.002 | 0.020 | 0.024 | 0.02 | — | 2 | — | — | — | Balance | 0.07 |
| 56 | 26 | 11 | 1 | 0.030 | 0.08 | — | 0.07 | — | 0.016 | 0.022 | — | 0.5 | — | 5 | — | — | Balance | 0.08 |
| 57 | 25 | 4 | — | 0.030 | 0.01 | 0.07 | 0.06 | — | 0.018 | 0.020 | 0.05 | 0.1 | — | 8 | — | — | Balance | 0.08 |
| 58 | 24 | 6 | 7 | 0.040 | 0.02 | — | 0.02 | 0.001 | 0.022 | 0.018 | 0.06 | 0.2 | 15 | 0 | 0 | 6 | Balance | 0.02 |
| 59 | 22 | 4 | 5 | 0.055 | — | 0.02 | 0.06 | 0.003 | 0.016 | 0.020 | 0.02 | 0.1 | 25 | 4 | — | — | Balance | 0.02 |
| 60 | 26 | 5 | 3 | 0.015 | — | 0.01 | 0.03 | — | 0.020 | 0.042 | — | 0.6 | — | 5 | 3 | — | Balance | 0.01 |
| 61 | 25 | 8 | 4 | 0.030 | 0.09 | — | 0.05 | 0.003 | 0.016 | 0.036 | — | — | 20 | — | 2 | — | Balance | 0.09 |
| 62 | 19 | 7 | 3 | 0.020 | — | 0.09 | 0.07 | 0.004 | 0.014 | 0.020 | — | — | 20 | 3 | 1 | 5 | Balance | 0.09 |
| 63 | 19 | 10 | 2 | 0.040 | 0.02 | 0.06 | 0.09 | 0.008 | 0.018 | 0.039 | — | 0.1 | 10 | — | — | 4 | Balance | 0.08 |
| 64 | 24 | 7 | 3 | 0.030 | 0.03 | — | 0.02 | 0.004 | 0.012 | 0.004 | 0.07 | 0.5 | — | 6 | — | — | Balance | 0.03 |
| 65 | 20 | 6 | 4 | 0.020 | — | 0.04 | 0.05 | 0.009 | 0.008 | 0.016 | — | 0.7 | 15 | 4 | — | — | Balance | 0.04 |
| 66 | 22 | 6 | 3 | 0.030 | — | 0.03 | 0.04 | 0.004 | 0.024 | 0.035 | 0.03 | 0.6 | — | — | — | — | Balance | 0.03 |
| 67 | 23 | 6 | 5 | 0.050 | 0.08 | — | 0.03 | — | 0.006 | 0.026 | 0.05 | — | — | 5 | 3 | 3 | Balance | 0.08 |
| 68 | 28 | 9 | 5 | 0.030 | 0.03 | 0.05 | 0.08 | — | 0.010 | 0.045 | 0.04 | 0.8 | 15 | 4 | 2 | 2 | Balance | 0.08 |
| 69 | 27 | 6 | 3 | 0.050 | 0.04 | — | 0.03 | — | 0.016 | 0.002 | — | 0.2 | 10 | 3 | 1 | — | Balance | 0.04 |
| 70 | 18 | 7 | 6 | 0.040 | 0.04 | — | 0.03 | 0.007 | 0.014 | 0.014 | 0.09 | 0.3 | 20 | 2 | — | — | Balance | 0.04 |
| 71 | 25 | 7 | 2 | 0.040 | 0.05 | — | 0.08 | 0.004 | 0.010 | 0.006 | 0.07 | 0.9 | — | 2 | — | — | Balance | 0.05 |
| 72 | 17 | 8 | 1 | 0.040 | 0.06 | — | 0.03 | — | 0.014 | 0.031 | 0.05 | 0.5 | 29 | 2 | 3 | 1 | Balance | 0.06 |
| 73 | 27 | 10 | 1 | 0.050 | 0.07 | 0.02 | 0.04 | 0.005 | 0.012 | 0.028 | 0.05 | 0.4 | 10 | 9 | 2 | — | Balance | 0.09 |

TABLE 3-continued

| No. | Cr | P | Si | C | Ti | Zr | V | Al | O | N | Nb | Mn | Fe | Co | Mo | Cu | Ni | Ti + Zr |
|---|---|---|---|---|---|---|---|---|---|---|---|---|---|---|---|---|---|---|
| 74 | 24 | 5 | 6 | 0.030 | 0.06 | 0.02 | 0.02 | — | 0.008 | 0.012 | 0.06 | — | 5 | — | 4 | — | Balance | 0.08 |
| 75 | 21 | 9 | 7 | 0.020 | 0.05 | — | 0.02 | 0.006 | 0.012 | 0.010 | — | — | 15 | 1 | 1 | 7 | Balance | 0.05 |

| No. | Inequality (1) | Inequality (2) | Liquidus | Flexural strength | Corrosion resistance | Brazing defects | Remarks |
|---|---|---|---|---|---|---|---|
| 54 | — | 0.35 | A | A | A | A | Inventive Examples |
| 55 | — | 0.37 | A | A | A | A | |
| 56 | 0.56 | — | A | A | A | A | |
| 57 | — | 0.70 | A | A | A | A | |
| 58 | — | 0.32 | A | A | A | A | |
| 59 | — | 0.31 | A | A | A | A | |
| 60 | 0.48 | — | A | A | A | A | |
| 61 | 0.40 | — | A | A | A | A | |
| 62 | 0.84 | — | A | A | A | A | |
| 63 | 0.54 | — | A | A | A | A | |
| 64 | — | 0.46 | A | A | A | A | |
| 65 | 0.60 | — | A | A | A | A | |
| 66 | — | 0.45 | A | A | A | A | |
| 67 | — | 0.27 | A | A | A | A | |
| 68 | — | 0.81 | A | A | A | A | |
| 69 | — | 0.25 | A | A | A | A | |
| 70 | — | 0.47 | A | A | A | A | |
| 71 | — | 0.71 | A | A | A | A | |
| 72 | — | 0.34 | A | A | A | A | |
| 73 | — | 0.32 | A | A | A | A | |
| 74 | — | 0.42 | A | A | A | A | |
| 75 | 0.24 | — | A | A | A | A | |

TABLE 4

| | Composition (mass %) | | | | | | | | | | | | | | | | | |
|---|---|---|---|---|---|---|---|---|---|---|---|---|---|---|---|---|---|---|
| No. | Cr | P | Si | C | Ti | Zr | V | Al | O | N | Nb | Mn | Fe | Co | Mo | Cu | Ni | Ti + Zr |
| 76 | 30 | 6 | — | 0.050 | 0.01 | 0.08 | 0.04 | 0.005 | 0.022 | 0.020 | 0.06 | 0.8 | 10 | 7 | — | — | Balance | 0.09 |
| 77 | 15 | 7 | 3 | 0.040 | 0.07 | — | 0.05 | 0.002 | 0.020 | 0.024 | 0.02 | — | 2 | — | — | — | Balance | 0.07 |
| 78 | 26 | 12 | 1 | 0.030 | 0.08 | — | 0.07 | — | 0.016 | 0.022 | — | 0.5 | — | 5 | — | — | Balance | 0.08 |
| 79 | 25 | 3 | — | 0.030 | 0.01 | 0.07 | 0.06 | — | 0.018 | 0.020 | 0.05 | 0.1 | — | 8 | — | — | Balance | 0.08 |
| 80 | 24 | 6 | 8 | 0.040 | 0.02 | — | 0.02 | 0.001 | 0.022 | 0.018 | 0.06 | 0.2 | 15 | — | — | 6 | Balance | 0.02 |
| 81 | 22 | 4 | 5 | 0.060 | — | 0.02 | 0.06 | 0.003 | 0.016 | 0.020 | 0.02 | 0.1 | 25 | 4 | — | — | Balance | 0.02 |
| 82 | 26 | 5 | 3 | 0.010 | — | 0.01 | 0.03 | — | 0.020 | 0.042 | — | 0.6 | — | 5 | 3 | — | Balance | 0.01 |
| 83 | 25 | 8 | 4 | 0.030 | 0.10 | — | 0.05 | 0.003 | 0.016 | 0.036 | — | — | 20 | — | 2 | — | Balance | 0.1 |
| 84 | 19 | 7 | 3 | 0.020 | — | 0.10 | 0.07 | 0.004 | 0.014 | 0.020 | — | — | 20 | 3 | 1 | 5 | Balance | 0.1 |
| 85 | 19 | 10 | 2 | 0.040 | 0.02 | 0.06 | 0.10 | 0.008 | 0.018 | 0.039 | — | 0.1 | 10 | — | — | 4 | Balance | 0.08 |
| 86 | 24 | 7 | 3 | 0.030 | 0.03 | — | 0.01 | 0.004 | 0.012 | 0.004 | 0.07 | 0.5 | — | 6 | — | — | Balance | 0.03 |
| 87 | 20 | 6 | 4 | 0.020 | — | 0.04 | 0.05 | 0.010 | 0.008 | 0.016 | — | 0.7 | 15 | 4 | — | — | Balance | 0.04 |
| 88 | 22 | 6 | 3 | 0.030 | 0.00 | 0.03 | 0.04 | 0.004 | 0.025 | 0.035 | 0.03 | 0.6 | — | — | — | — | Balance | 0.03 |
| 89 | 23 | 6 | 5 | 0.050 | 0.08 | — | 0.03 | — | 0.005 | 0.026 | 0.05 | — | — | 5 | 3 | 3 | Balance | 0.08 |
| 90 | 28 | 9 | 5 | 0.030 | 0.03 | 0.05 | 0.08 | — | 0.010 | 0.050 | 0.04 | 0.8 | 15 | 4 | 2 | 2 | Balance | 0.08 |
| 91 | 27 | 6 | 3 | 0.050 | 0.04 | — | 0.03 | — | 0.016 | 0.001 | 0.04 | 0.2 | 10 | 3 | 1 | — | Balance | 0.04 |
| 92 | 18 | 7 | 6 | 0.040 | 0.04 | — | 0.03 | 0.007 | 0.014 | 0.014 | 0.10 | 0.3 | 20 | — | — | — | Balance | 0.04 |
| 93 | 25 | 7 | 2 | 0.040 | 0.05 | — | 0.08 | 0.004 | 0.010 | 0.006 | 0.07 | 1.0 | — | 2 | — | — | Balance | 0.05 |
| 94 | 17 | 8 | 1 | 0.040 | 0.06 | — | 0.03 | — | 0.014 | 0.031 | 0.05 | 0.5 | 30 | 2 | 3 | 1 | Balance | 0.06 |
| 95 | 27 | 10 | 1 | 0.050 | 0.07 | 0.02 | 0.04 | 0.005 | 0.012 | 0.028 | 0.05 | 0.4 | 10 | 10 | 2 | — | Balance | 0.09 |
| 96 | 24 | 5 | 6 | 0.030 | 0.06 | 0.02 | 0.02 | — | 0.008 | 0.012 | 0.06 | — | 5 | — | 5 | — | Balance | 0.08 |
| 97 | 21 | 9 | 7 | 0.020 | 0.05 | — | 0.02 | 0.006 | 0.012 | 0.010 | — | — | 15 | 1 | 1 | 7.5 | Balance | 0.05 |
| 98 | 22 | 4 | 5 | 0.055 | — | 0.02 | 0.03 | 0.003 | 0.016 | 0.020 | 0.01 | 0.1 | 25 | 4 | — | — | Balance | 0.02 |
| 99 | 26 | 5 | 3 | 0.015 | — | 0.01 | 0.07 | — | 0.020 | 0.042 | — | 0.6 | — | 5 | 3 | — | Balance | 0.01 |

| No. | Inequality (1) | Inequality (2) | Liquidus | Flexural strength | Corrosion resistance | Brazing defects | Remarks |
|---|---|---|---|---|---|---|---|
| 76 | — | 0.35 | B | A | A | A | Comparative Examples |
| 77 | — | 0.37 | A | A | C | A | |
| 78 | 0.56 | — | B | B | A | A | |
| 79 | — | 0.70 | B | A | A | A | |
| 80 | — | 0.32 | B | B | A | A | |
| 81 | — | 0.28 | A | B | A | C | |
| 82 | 0.72 | — | A | A | A | A | |
| 83 | 0.40 | — | A | B | A | C | |
| 84 | 0.84 | — | A | B | A | C | |
| 85 | 0.60 | — | A | B | A | C | |
| 86 | — | 0.38 | A | B | A | C | |
| 87 | 0.60 | — | A | B | A | C | |
| 88 | — | 0.45 | A | B | A | C | |
| 89 | — | 0.27 | A | A | A | A | |

TABLE 4-continued

| | | | | | | |
|---|---|---|---|---|---|---|
| 90 | — | 0.81 | A | B | A | C |
| 91 | — | 0.25 | A | A | A | A |
| 92 | — | 0.51 | A | B | A | C |
| 93 | — | 0.71 | A | B | A | C |
| 94 | — | 0.34 | B | A | A | A |
| 95 | — | 0.32 | A | A | A | A |
| 96 | — | 0.42 | B | A | A | A |
| 97 | 0.24 | — | A | B | A | A |
| 98 | — | 0.15 | A | B | A | C |
| 99 | 1.12 | — | A | B | A | C |

Note 1)
Underlined value indicates out of the range of the invention.

Note 2)
Example 82 requires expensive low-C raw materials;
Example 89 requires a costly reduction process for decreasing the O content;
Example 91 requires costly melting in high-purity argon;
Example 95 is expensive for the high-Co composition.

The results shown in Tables 1 to 4 demonstrate that Examples 1 to 10, 25 to 28, 31 to 37, 44 to 47, 51 to 52, and 54 to 75 are inventive examples, and Examples 11 to 24, 29 to 30, 38 to 43, 48 to 50, 53, and 76 to 99 are comparative examples.

Example 11 having a low C content requires expensive high-purity raw materials, including Cr. Example 12 also having a low C content requires expensive high-purity raw materials, including Cr. Example 12 also has a high value in the Inequality (1), which induced brazing defects and decreased the flexural strength of the brazed portion. Examples 13 and 15 having a low V content and a low value in the Inequality (1) induced brazing defects and decreased the flexural strength of the brazed portion. Example 14 having a high value in the Inequality (1) induced brazing defects and decreased the flexural strength of the brazed portion. Example 16 having a high value in the Inequality (1) induced brazing defects and decreased the flexural strength of the brazed portion.

Examples 17, 19, and 21 having a low value in the Inequality (1) induced brazing defects and decreased the flexural strength of the brazed portion. Examples 18, 20, and 22 having a high V content induced brazing defects and decreased the flexural strength of the brazed portion. Examples 23 and 24 having a high C content induced brazing defects and decreased the flexural strength of the brazed portion. Example 29 having a low V content and a high Nb content induced brazing defects and decreased the flexural strength of the brazed portion. Example 30 having a high value in the Inequality (2) induced brazing defects and decreased the flexural strength of the brazed portion. Example 38 having a low C content requires expensive high-purity raw materials, including Cr.

Example 39 having a low V content and a low value in the Inequality (1) induced brazing defects and decreased the flexural strength of the brazed portion. Example 40 having a high value in the Inequality (1) induced brazing defects and decreased the flexural strength of the brazed portion. Example 41 having a low value in the Inequality (1) induced brazing defects and decreased the flexural strength of the brazed portion. Examples 42 and 49 having a high V content induced brazing defects and decreased the flexural strength of the brazed portion. Examples 43 and 50 having a high C content induced brazing defects and decreased the flexural strength of the brazed portion. Example 48 having a low C content and a high value in the Inequality (1) requires expensive high-purity raw materials, including Cr.

Example 53 having a low V content and a high Nb content induced brazing defects and decreased the flexural strength of the brazed portion. Examples 76, 94, and 96 having high contents of Cr, Fe, and Mo, respectively, had an excessively high liquidus temperature. Example 77 having a low Cr content had poor corrosion resistance. Example 78 having a high P content had an increased liquidus temperature, and decreased the flexural strength of the brazed portion. Example 79 having a low P content had an increased liquidus temperature. Example 80 having a high Si content had an increased liquidus temperature, and decreased the flexural strength of the brazed portion. Example 81 having a high C content induced brazing defects and decreased the flexural strength of the brazed portion. Example 82 having a low C content requires expensive high-purity raw materials, including Cr.

Examples 83 and 84 having a high Ti+Zr content induced brazing defects and decreased the flexural strength of the brazed portion. Example 85 having a high V content induced brazing defects and decreased the flexural strength of the brazed portion. Example 86 having a low V content induced brazing defects and decreased the flexural strength of the brazed portion. Example 87 having a low Al content induced brazing defects and decreased the flexural strength of the brazed portion. Comparative Examples 88 and 90 having high contents of O and N, respectively, induced brazing defects and decreased the flexural strength of the brazed portion. Example 89 having a low O content required a costly reduction process for decreasing the O content. Example 91 having a low N content required costly melting in high-purity argon for decreasing the N content.

Examples 92 and 93 having high contents of Nb and Mn, respectively, induced brazing defects and decreased the flexural strength of the brazed portion. Example 95 having a high Co content is expensive for the high-Co composition. Example 97 having a high Cu content decreased the flexural strength of the brazed portion. Example 98 having a low value in the Inequality (2) induced brazing defects and decreased the flexural strength of the brazed portion. Example 99 having a high value in the Inequality (1) induced brazing defects and decreased the flexural strength of the brazed portion.

In contrast, all of Examples 1 to 10, 25 to 28, 31 to 37, 44 to 47, 51 to 52, and 54 to 75 satisfy the requirements of the present invention, and demonstrate excellent effects such as sufficient flexural strength and corrosion resistance and prevention of brazing defects.

The invention claimed is:

1. A Ni—Cr-based brazing alloy comprising, on the basis of mass %:
more than 15% and less than 30% Cr;
more than 3% and less than 12% P;
less than 8% (inclusive of 0%) Si;
more than 0.01% and less than 0.06% C;
less than 0.1% (inclusive of 0%) Ti+Zr;

more than 0.01% and less than 0.1% V;
less than 0.01% (inclusive of 0%) Al;
more than 0.005% and less than 0.025% O;
more than 0.001% and less than 0.050% N;
less than 5% (inclusive of 0%) Cu; and
the balance being Ni and incidental impurities,
wherein the alloy comprises no Nb,
and wherein $0.2 \leq 0.24 \text{V} \%/\text{C} \% \leq 1.0$.

2. The Ni—Cr-based brazing alloy according to claim 1, further comprising, on the basis of mass %:
less than 1% Mn;
less than 30% Fe;
less than 10% Co; and
less than 5% Mo.

* * * * *